Sept. 27, 1932. H. T. INGERSON 1,879,271
LAWN MOWER
Filed May 23, 1931 3 Sheets-Sheet 1
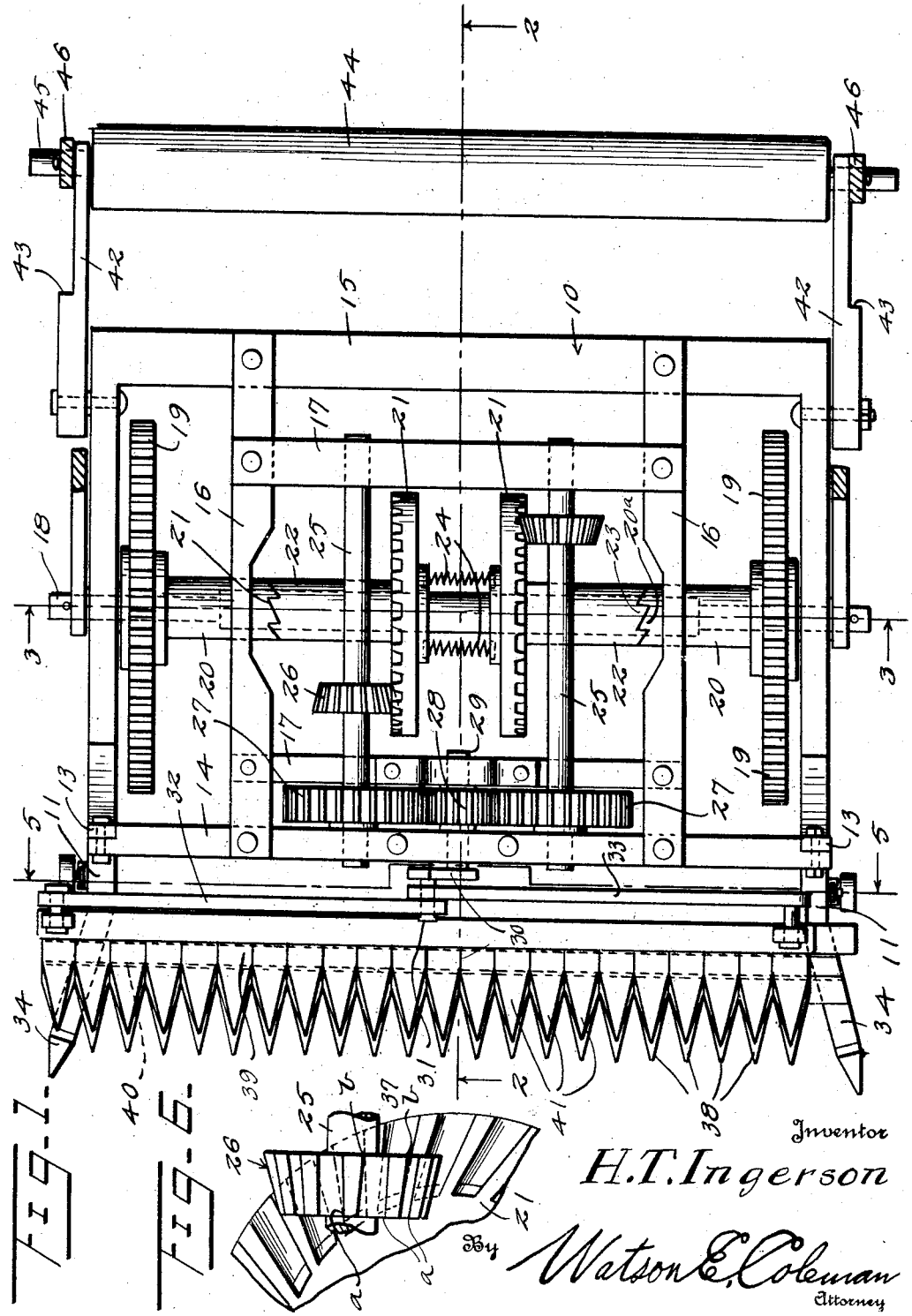

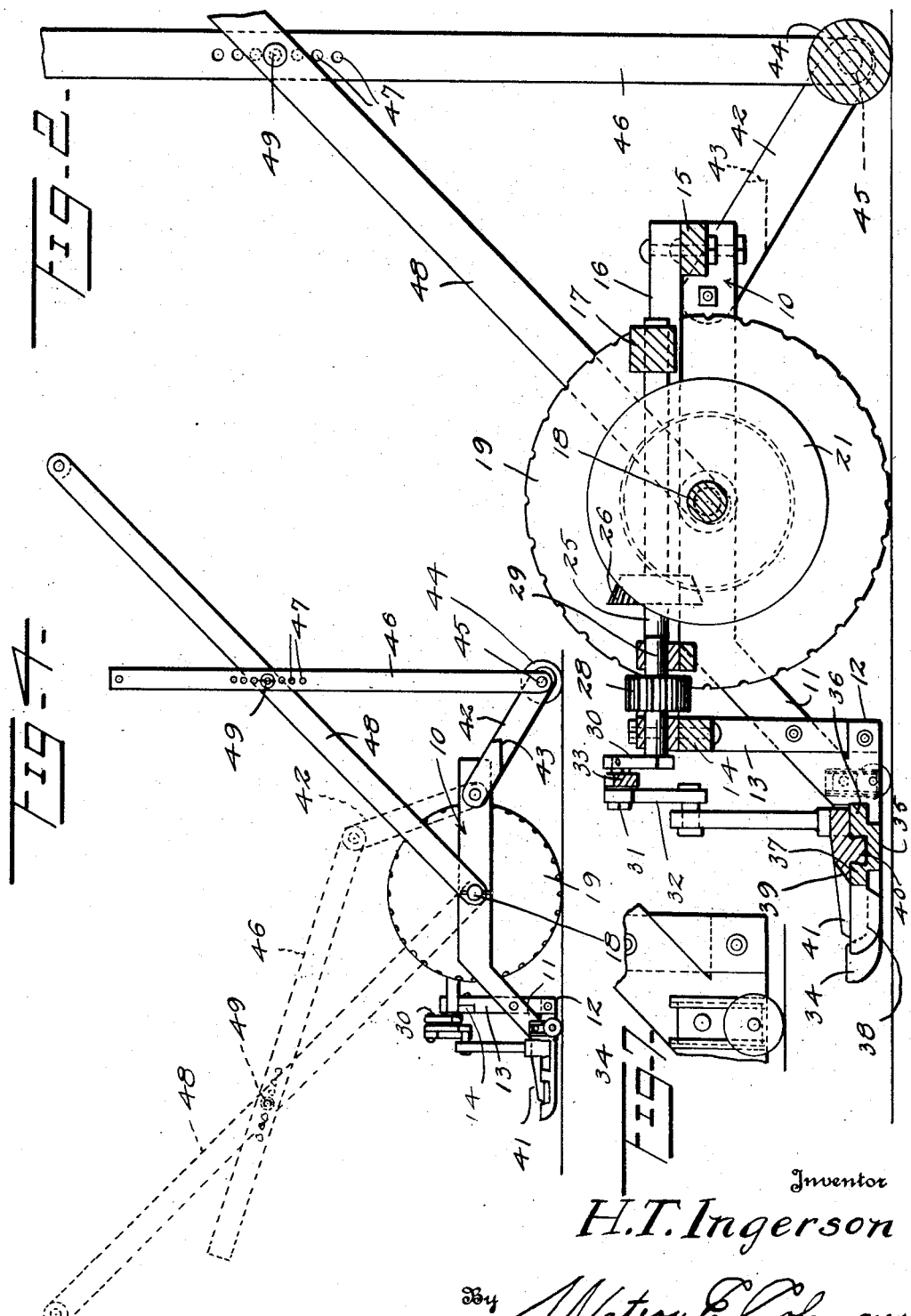

Sept. 27, 1932.   H. T. INGERSON   1,879,271
LAWN MOWER
Filed May 23, 1931   3 Sheets-Sheet 3
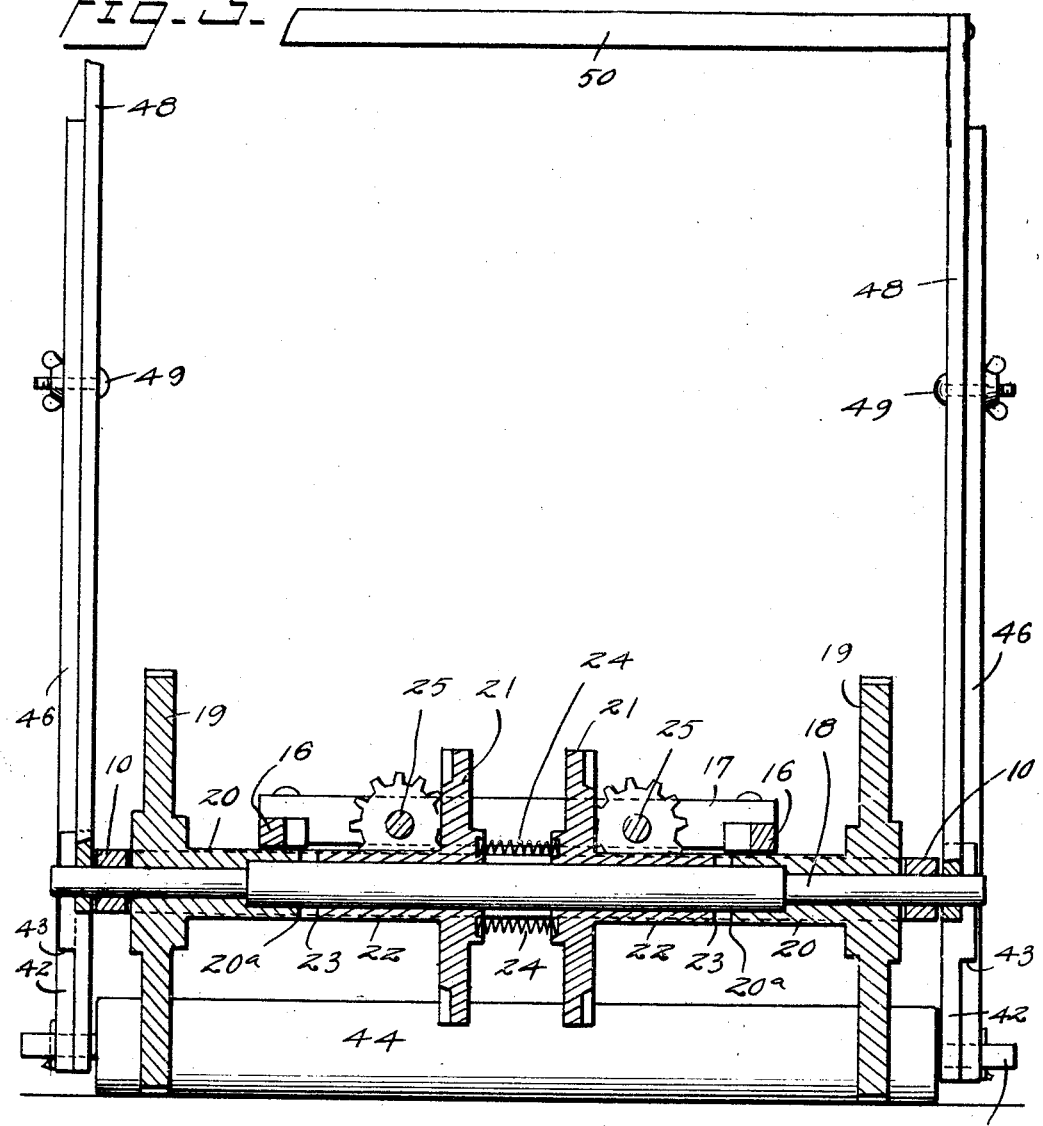
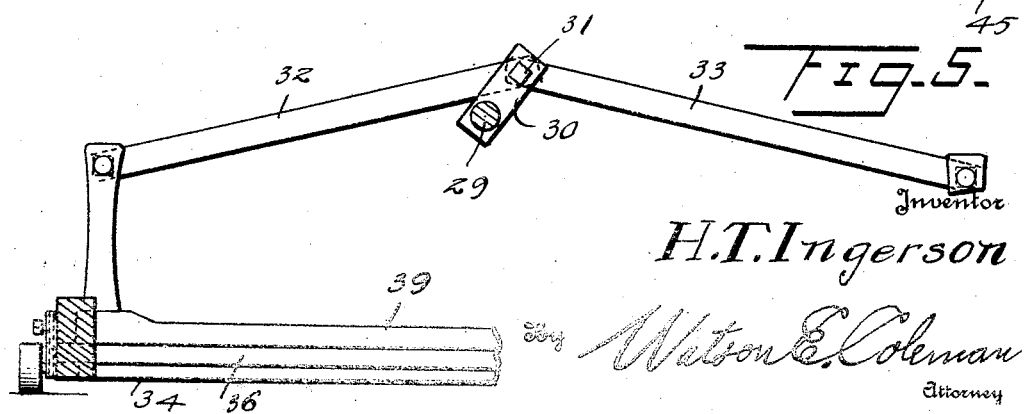
Inventor
H.T.Ingerson
By Watson E. Coleman
Attorney Patented Sept. 27, 1932

1,879,271

UNITED STATES PATENT OFFICE

HARRY T. INGERSON, OF PATTEN, MAINE

LAWN MOWER

Application filed May 23, 1931. Serial No. 539,599.

This invention relates to mowing machines and particularly to lawn mowers of that general type in which reciprocating blades are used, thereby permitting the mower to be used in cutting relatively long grass which it is impossible to cut with the ordinary rotary knife lawn mower.

The general object of the invention is to provide a mower of this character which is relatively simple and positive as regards its driving means and which is so constructed that the mower, when moved rearward, will not operate the knife bar.

A further object is to provide means whereby the knives may be raised or lowered with reference to the ground and whereby the handle may be raised or lowered so as to adjust it to suit the operator and in which, by turning the handle over toward the front of the lawn mower, the mower may be pushed rearward to thus prevent the blades from being actuated while the machine is being pushed over the lawn.

Other objects will appear in the course of the following description.

My invention is illustrated in the accompanying drawings, wherein:—

Figure 1 is a top plan view of a mower constructed in accordance with my invention, the handle bars being shown in section;

Figure 2 is a section on the line 2—2 of Figure 1;

Figure 3 is a section on the line 3—3 of Figure 1;

Figure 4 is a side elevation showing in dotted and full lines two positions of the handle and handle bars;

Figure 5 is a section on the line 5—5 of Figure 1;

Figure 6 is a fragmentary face view of one of the main driving gears showing the formation of the teeth and also showing a pinion engaged with these driving gears.

Figure 7 is a fragmentary detailed elevation of the supporting frame and spring means whereby the frame may be vertically adjusted.

Referring to these drawings, 10 designates a main frame which may be of any suitable construction. This frame extends horizontally and then downward and forward as at 11 (see Figures 2 and 4) and the lower portion of the frame is provided with the rearwardly extending portions 12 which support the vertical portions 13 bolted to the inclined portions 11, which in turn support a forward cross bar 14, this forward cross bar being on a level with a rear cross bar 15 which forms part of the frame 10. The forward and rear cross bars are connected by the two longitudinally extending bars 16 which in turn are connected by the braces 17 and 17. Mounted in the side bars of the frame 10 in suitable bearings is a transverse shaft 18. Loosely mounted upon the ends of this shaft adjacent the sides of the frame 10 are the ground engaging driving wheels 19. These are each connected or formed as part of a hub 20 formed with clutch teeth 20ª, these clutch teeth being inclined rearward. Slidingly mounted upon the shaft 18 are the two main driving gear wheels 21 which are independent of each other, each of these gear wheels having a hub 22 formed with clutch teeth 23 coacting with the clutch teeth 20ª.

Springs 24 urge these gear wheels 21 laterally outward, and, therefore, urge the clutch teeth 23 into engagement with the clutch teeth 20ª.

Mounted in bearings upon the bars 14, 16 and 17 are the longitudinally extending shafts 25, each of which carries a beveled pinion 26 engaging one of the beveled gear wheels 21. As shown in Figure 6, the teeth of the beveled gear wheels 21 are not radial but are tangential to a circle described around the axial center of the wheel and the teeth of the gear wheel 26 are of just sufficient size to enter between the teeth of the gear wheel 21 and are so formed that when a tooth of the pinion 26 is in mesh between the teeth of the gear wheel 21, the tooth of the pinion will contact at the point $a$ with one tooth of the gear wheel 21 while the opposite corner of the pinion tooth at $b$ will contact with the opposite tooth on the gear wheel 21. This peculiar shape of the teeth is rendered necessary by the fact that the axial centers of the shafts 25 are above the axial center upon which the gear wheels 21 operate instead of intersecting the latter.

The shafts 25 carry upon them the gear wheels 27 which mesh with an intermediate gear wheel or pinion 28 mounted upon a short shaft 29 carried in bearings on the cross bars 14 and 17. This shaft 29 carries upon it the crank 30, the crank pin 31 of which crank engages with the oppositely extending connecting rods 32 and 33.

The forward end of the frame has the forwardly and laterally projecting extensions 34 which are formed to provide lateral fingers, these extensions or fingers 34 being connected by a transversely extending portion 35 carrying the lateral guides 36 and 37 constituting in effect a ledger plate.

Fingers 38 project from the portion 37. Operating over the upper face of the guides 36 and 37 is the knife bar 39 having a downwardly extending tongue 40 having dovetailed engagement with the guides 36 and 37. This knife bar carries the usual knives 41 reciprocating over the fingers. It will be obvious now that as the machine is pushed forward, the ground engaging wheels will transmit power to the shafts 25 which in turn will rotate the crank 30 which will cause a reciprocation of the connecting rods 32 and 33 which in turn will cause a reciprocation of the knife bar and knives.

Pivotally connected to the rear end of the frame are two rearwardly extending arms 42, each of them shouldered upon its outer face as at 43, the shoulder being angular. Between these arms is mounted the roller 44 having outwardly extending gudgeons 45. Extending upward from the gudgeons and pivotally engaged therewith are the vertical rods 46 which act as handle supports and which are preferably provided with a plurality of holes 47. Handle bars 48 engage the shaft 18 and extend rearward and upward therefrom and a pin 49 engages the handle bars with the rods 46. By adjusting this pin in any one of the holes 47, the handle bars may be held in a rised or lowered position. The handle bars are connected by a transverse handle 50.

The operation of this mechanism is obvious from what has gone before. With the parts in full line position shown in Figure 4, the machine is pushed forward, which causes a reciprocation of the cutting knife over the fingers. In the rearward movement, however, the clutches 21 and 23 will slip by each other so that while the ground engaging wheels will rotate, no reciprocation will be given to the cutter bar. When it is desired to roll the machine away without doing any cutting, the handle is shifted to the dotted line position in Figure 4 which raises the roller off the ground and brings the handle into position where the machine may be pushed backward, in which position, of course, the cutting knife is not operative.

Obviously certain details may be changed and particularly the proportions of the machine be changed without in any way departing from the spirit of the invention as defined in the appended claims.

Any means may be used for the purpose of holding the cutting knives at a desired distance from the ground, but I have illustrated vertically adjustable wheels for this purpose.

I claim:—

1. A mowing machine of the character described, comprising a supporting frame, a shaft passing therethrough, ground engaging wheels mounted upon the shaft and each having a laterally projecting hub provided with clutch teeth, the forward end of the frame extending downward and forward and being formed to provide a cutter bar support having fingers, a pair of gear wheels loosely mounted upon said shaft and each having a hub extending toward the hub of a driving wheel and formed with clutch teeth coacting with the clutch teeth on the hub of the driving wheel, springs urging said gear wheels toward the ground engaging wheels, longitudinally extending shafts mounted upon the frame and having pinions engaging said gear wheels, a crank shaft having a pinion thereon, gear wheels carried on the longitudinally extending shafts for engaging said pinion, a cutter bar mounted upon the cutter bar supporting element for reciprocation thereon, and connecting rods pivotally connected to opposite ends of the cutter bar and to said crank pin, a roller carried at the rear end of the supporting frame, and handle bars extending upward and rearward from the shaft, the handle bars being vertically adjustable.

2. In a lawn mower of the character described, a supporting frame, ground engaging wheels mounted thereon, a reciprocating cutter bar, means connected to the ground engaging wheels for reciprocating said knife bar, rearwardly extending arms pivotally connected to the frame, a roller carried thereby, rods extending upward from the free ends of said arms, and handle bars pivoted upon the frame and extending upward and rearward therefrom and detachably engaged with said rods.

3. In a mowing machine, a supporting frame formed to provide a cutter bar support, ground engaging wheels carried by the frame, a reciprocatable cutter bar on the cutter bar support, means operatively connected to and driven by the ground engaging wheels for reciprocating said cutter bar, arms pivoted to the rear of said frame and extending rearward therefrom, vertical supports extending upward from the arms and pivoted thereto, and handle bars pivotally engaged with said frame and extending upward and detachably engaged with said vertical supports whereby the handle bars may be turned to a position over the cutter bar to permit the machine to be pusher rearward.

In testimony whereof I hereunto affix my signature.

HARRY T. INGERSON.